US010337488B1

United States Patent
Heim (10) Patent No.: US 10,337,488 B1
(45) Date of Patent: Jul. 2, 2019

(54) WAVE ENERGY CONVERTER DEEP SEA MOUNTING SYSTEM

(71) Applicant: John J. Heim, Malta, NY (US)

(72) Inventor: John J. Heim, Malta, NY (US)

( * ) Notice: Subject to any disclaimer, the term of this patent is extended or adjusted under 35 U.S.C. 154(b) by 18 days.

(21) Appl. No.: 15/851,400

(22) Filed: Dec. 21, 2017

(51) Int. Cl.
| | |
|---|---|
| *F03B 13/18* | (2006.01) |
| *B63B 35/44* | (2006.01) |
| *F16H 31/00* | (2006.01) |
| *F16F 15/30* | (2006.01) |
| *B63B 39/06* | (2006.01) |
| *B63B 21/50* | (2006.01) |

(52) U.S. Cl.
CPC .......... *F03B 13/1815* (2013.01); *B63B 35/44* (2013.01); *F16H 31/001* (2013.01); *B63B 21/50* (2013.01); *B63B 2035/4466* (2013.01); *B63B 2039/067* (2013.01); *F16F 15/30* (2013.01)

(58) Field of Classification Search
CPC ..... F03B 13/1815; B63B 35/44; B63B 21/50; B63B 2039/067; B63B 2035/4466; F16H 31/001; F16F 15/30
USPC ................. 60/497, 500, 504, 505, 506, 507
See application file for complete search history.

(56) References Cited

U.S. PATENT DOCUMENTS

| | | | | |
|---|---|---|---|---|
| 4,516,033 A | * | 5/1985 | Olson .................. | F03B 17/062 290/42 |
| 6,711,897 B2 | * | 3/2004 | Lee ..................... | F03B 13/1815 60/496 |
| 7,791,213 B2 | * | 9/2010 | Patterson ............ | F03B 13/1865 290/53 |
| 7,891,183 B2 | * | 2/2011 | Al-Huwaider ...... | F03B 13/1865 60/497 |
| 2007/0228736 A1 | * | 10/2007 | Smushkovich ..... | F03B 13/1845 290/42 |
| 2015/0069761 A1 | * | 3/2015 | Heim .................. | F03B 13/1815 290/53 |

* cited by examiner

*Primary Examiner* — Hoang M Nguyen (57) ABSTRACT

A wave energy converter deep sea mounting system consists of a floatable platform, an enclosure, a wave energy converter mechanism, a generator, a float arm, and a float. The enclosure is mounted atop the floatable platform by an enclosure support axle, about which the enclosure can rotate. The wave energy converter mechanism and the electrical generator are mounted within the enclosure. The float arm is connected between the enclosure and a stationary float, and as the floatable platform rises and falls due to wave action, the enclosure is thus rotated. The wave energy converter mechanism has a stationary input pulley connected through at least one pulley system to a generator output pulley, multiplying input rotations from the float arm action to the electrical generator in order to generate electricity. As the enclosure rotates about the stationary input pulley, the remaining pulleys are forced to spin through rotation about the stationary input pulley.

18 Claims, 10 Drawing Sheets

FIG. 10 though other means such as harnessing the kinetic energy of flowing water and wind. Other energy sources include solar photovoltaics and geothermal power. In most modern developed areas, electrical power is typically generated at a power plant and delivered to individual homes, businesses or other recipients through an electrical distribution grid. However, people who live on islands in oceans or lakes large enough to have reasonably constant wind, or shorelines, or similar areas may not have consistent or reliable access to an electrical grid, and it may be desirable to seek alternative methods to provide electrical power for their households. One such alternative is to install a device in a nearby body of water with wave action in order to convert the kinetic wave energy into electrical power.

WAVE ENERGY CONVERTER DEEP SEA MOUNTING SYSTEM

FIELD OF THE INVENTION

The present invention relates generally to electricity generation. More particularly, the present invention relates to converting water wave energy into electrical power.

BACKGROUND OF THE INVENTION

Electricity generation is the process of generating electric power from sources of primary energy, such as through electromechanical generators driven by heat engines fueled by combustion or nuclear fission, and/or through other means such as harnessing the kinetic energy of flowing water and wind. Other energy sources include solar photovoltaics and geothermal power. In most modern developed areas, electrical power is typically generated at a power plant and delivered to individual homes, businesses or other recipients through an electrical distribution grid. However, people who live on islands in oceans or lakes large enough to have reasonably constant wind, or shorelines, or similar areas may not have consistent or reliable access to an electrical grid, and it may be desirable to seek alternative methods to provide electrical power for their households. One such alternative is to install a device in a nearby body of water with wave action in order to convert the kinetic wave energy into electrical power.

The present invention seeks to provide a wave energy converter (WEC) system that meets the following criteria: 1) is not expensive, 2) can operate as well in deep as shallow water, 3) can be fully water and wind proofed so it can be sustained untended in water for long periods of time, 4) can operate well in all wind conditions, and 5) can use leverage to reduce the force necessary to generate electricity. No previous art seems to meet all these conditions. Features 2, 3 and 4 are absolutely necessary for any WEC system that is actually useable; conditions 1 and 5 are highly desirable. Unless a WEC design contains solutions to these problems, it is not likely to be of practical use.

The present invention seeks to address these problems by presenting a moveable raft with a long lever arm and a float at its opposite end. The float is stationary, connected by anchor line to the sea bed, which may be far below sea level. As the raft bobs up and down, it moves the lever at the raft end, though the float end stays stationary. This movement turns gears or pulleys which operate a generator, generating electricity. The WEC machinery on the raft is hermetically enclosed in a capsule, making it weather proof. No opening is required to allow the lever to move up and down, as is typical in prior lever-based art. The raft is designed to look like a weather vane, so it always faces into the wind. Wind or no wind, the float at the end of the lever remains stationary at trough water level, but rising waves raise the raft and WEC generating electricity. Construction of the raft and WEC can be low tech. Materials for the raft suitable for generating electric for 5 families are estimated to be relatively low-cost and suitable for application with individual households.

Prior art in which the platform and/or WEC is anchored using a post-based system (the "oil rig" anchoring system) does not allow WEC usage in deep water, except at exorbitant cost, affordable only by large communities already most likely to have electricity. The other alternative, anchor line-based prior art, simply does not work in windy conditions. These anchor line designs depend on gears or pulleys moving back and forth along the anchor line due to rising and falling waves. With wind, the gear driven WEC mechanism can be blown to the far end of the anchor line and held there by the wind as waves rise and fall; hence, there is no movement by the mechanism along the anchor line, and therefore no electricity generated. This is a flaw in its design which renders it unsuitable for practical applications. Both types of prior art seem to provide exposure to weather and salt water which could impede the WEC's functioning.

The current invention uses an anchor line to provide a cost-effective way of connecting the moving platform supporting the WEC device to the stationary sea bed, no matter how deep the water is, without the limitations found in prior art using anchor lines. The relative motion is then harvested to produce electricity. The WEC is hermetically sealed, providing full weather protection to the WEC machinery, located inside the sealed capsule. The new invention is furthermore unaffected by wind.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a mounting system for a wave energy converter (WEC) that is inexpensive, is able to operate in any water depth, can be fully water and windproof in order to operate untended for long periods of time, can operate in all wind conditions, and can use leverage to reduce force necessary to generate electricity.

For the purposes of the present disclosure, a wave energy converter (WEC) utilizes the reciprocating rotational motion of a device placed in water to generate electricity. The reciprocating rotational motion is caused by repeated wave action which drives an electrical generator in order to produce electricity. An enclosure containing the WEC device for converting waves to electricity is connected to a mount on a platform floating at water level and rotates on an axle connecting it to the mount. A float arm is attached to the enclosure at one end, and the stationary float at the other, is lifted repeatedly at the enclosure end by waves, producing rotational motion of the enclosure around the axle connecting it to the platform mount. This axle, to which an input pulley is connected, does not turn as the enclosure revolves around it. A system of pulleys and/or gears attached by axle to the enclosure, turn because of their motion around the belt or chain connecting them to the stationary input axle. This transfers power through one or more systems of pulleys to an output axle connected to the generator. The system of pulleys multiplies the input rotation through mechanical advantage into a much faster angular speed at the output axle. It is contemplated that where applicable, references to pulleys or gears may be understood to be interchangeable or may be utilized in conjunction with each other, in that the pulleys and/or gears serve the same purpose of producing a mechanical advantage in multiplying an input rotation at the float arm into a faster output rotation at the generator. The pulleys and/or gears may be connected to each other through any applicable means, such as, but not limited to, flat belts, V-belts, other belt types, roller chains, or other types of chains. A reversible ratchet gear maintains influence of the float arm on the system on both the upstroke and downstroke. A flywheel may be used to store rotational energy to maintain a stable rotational rate.

Figure 1:
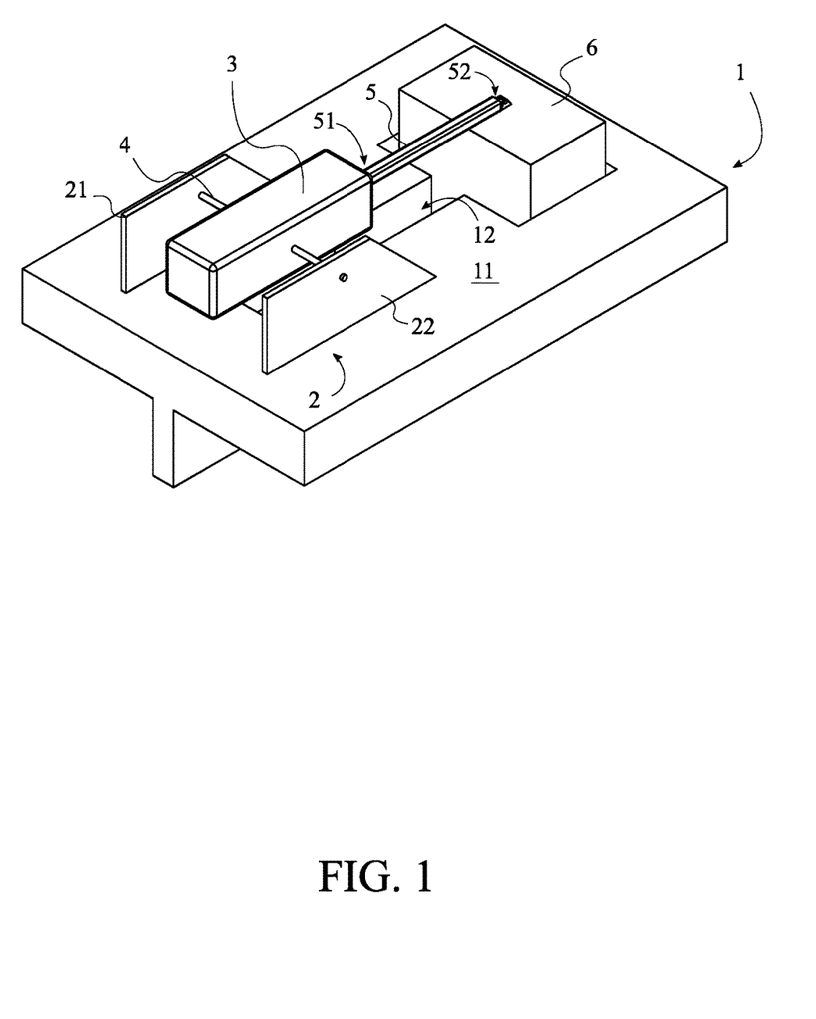
FIG. 1 is a perspective view of one embodiment of the present invention.
Figure 2:
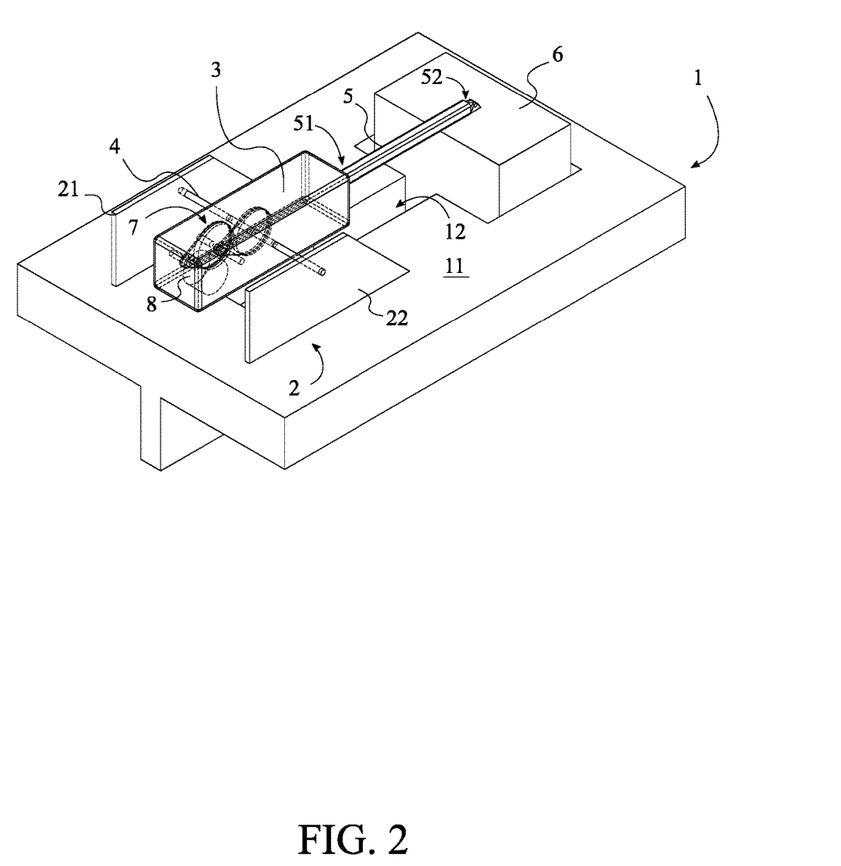
FIG. 2 is perspective view of one embodiment of the present invention showing the wave energy converter mechanism internal to the enclosure.

Referring to FIGS. 1-2, in general, the present invention comprises a floatable platform 1, an enclosure 3, an enclosure support axle 4, a float arm 5, a float 6, a wave energy converter mechanism 7, and an electrical generator 8.

The float arm 5 comprises a proximal end 51 and a distal end 52. The enclosure support axle 4 is mounted to the floatable platform 1, wherein the enclosure support axle 4 is affixed in place relative to the floatable platform 1 and does not rotate relative to the floatable platform 1. The enclosure support axle 4 traverses through the enclosure 3, and the enclosure 3 is rotatably engaged with the enclosure support axle 4, wherein the enclosure 3 is free to rotate about the enclosure support axle 4.

Figure 3:
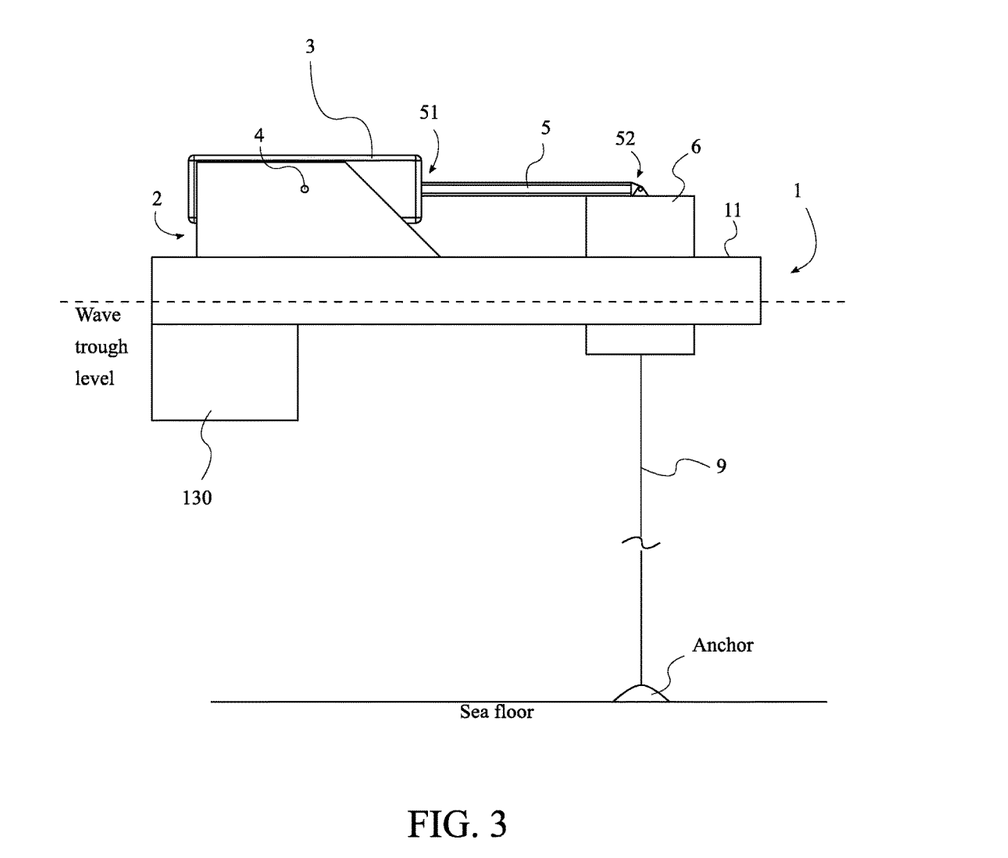
FIG. 3 is a side view of the present invention at wave trough level according to one embodiment of the present invention.
Figure 4:
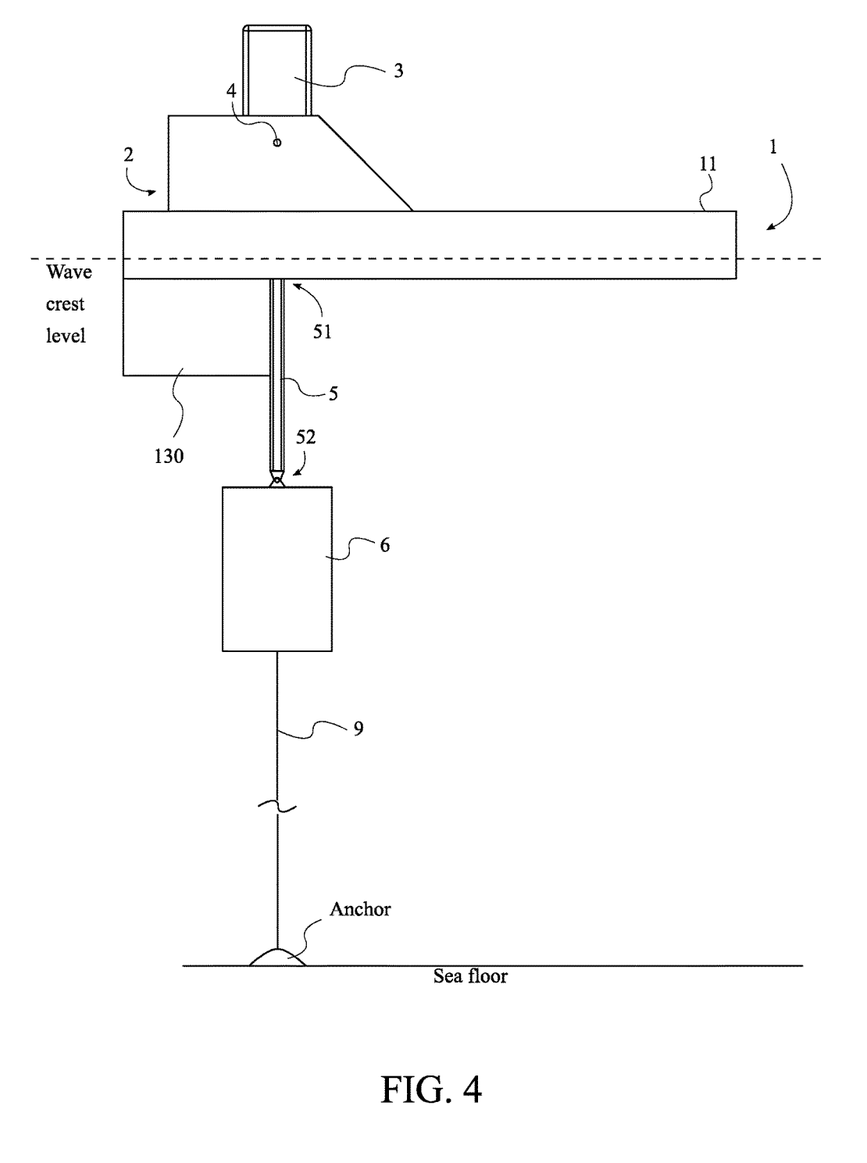
FIG. 4 is a side view of the present invention at wave crest level according to one embodiment of the present invention.

The preferred embodiment of the present invention further comprises an anchor line 9 connected to the float 6 at one end and to the sea bed at the other end of the anchor line 9. Thus, the floatable platform 1 is maintained within an acceptable positioning range atop the water. Preferably, the anchor line 9 will remain taut against wave and wind forces, so that the float 6 remains stationary at trough water level. FIGS. 3-4 illustrate the rotation of the enclosure 3 due to the float 6 and anchor line 9 as waves crest and fall while the float 6 stays taut on the anchor line 9.

Figure 5:
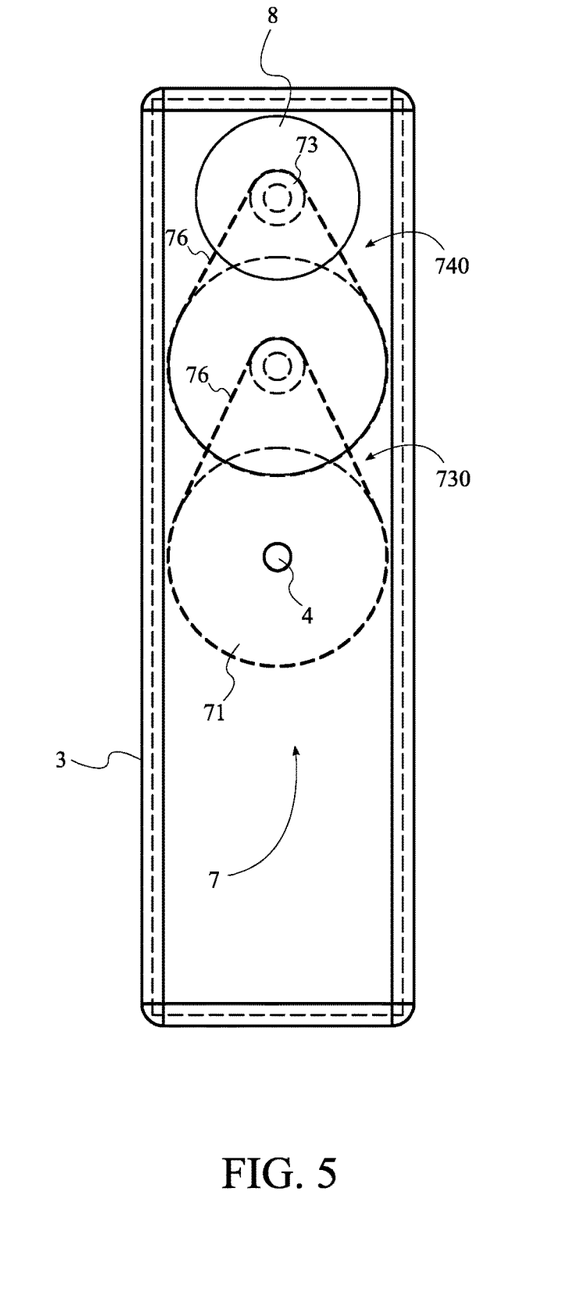
FIG. 5 is an internal side view of the enclosure showing the wave energy converter mechanism according to one embodiment of the present invention.
Figure 6:
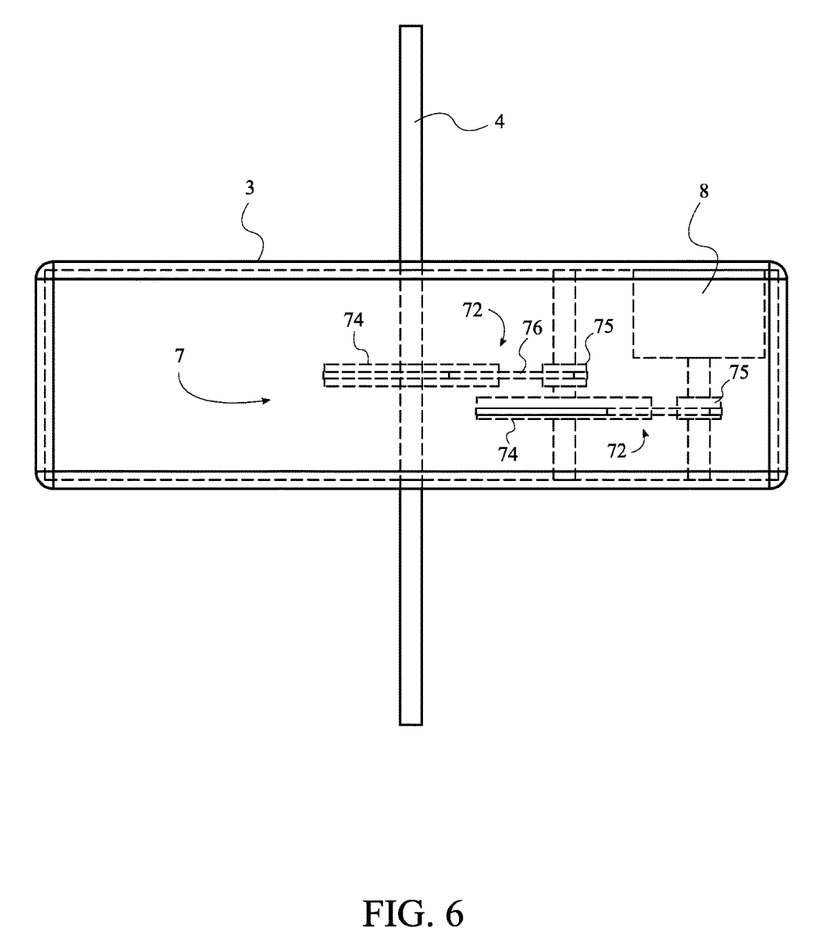
FIG. 6 is an internal top view of the enclosure showing the wave energy converter mechanism according to one embodiment of the present invention.

The wave energy converter mechanism 7 and the electrical generator 8 are positioned within the enclosure 3. Referring to FIGS. 5-6, the wave energy converter mechanism 7 comprises a stationary input pulley 71, at least one pulley system 72, and a generator output pulley 73, wherein each of the at least one pulley system 72 comprises a large input pulley 74 and a small output pulley 75. The large input pulley 74 is torsionally coupled to the small output pulley 75 by a belt 76 for each of the at least one pulley system 72.

The stationary input pulley 71 is mounted within the enclosure 3, such that the stationary input pulley 71 is restrained from rotation relative to the enclosure 3. The float 6 is connected to the distal end 52 of the float arm 5, and the proximal end 51 of the float arm 5 is connected to the enclosure 3. The stationary input pulley 71 is torsionally and mechanically coupled to the generator output pulley 73 through the at least one pulley system 72, and the generator output pulley 73 is rotatably coupled to the electrical generator 8.

In the preferred embodiment of the present invention, the wave energy converter mechanism 7 and the electrical generator 8 are both hermetically sealed within the enclosure 3, making the wave energy converter mechanism 7 and the electrical generator 8 weatherproof and waterproof against various environmental hazards which may potentially damage the present invention. For example, unusual weather conditions may cause unusually high wave peaks to "swamp" the floatable platform 1 and WEC. For the present invention to be of practical use, it is important that it be capable of withstanding submersion without damage.

Furthermore, the float arm 5 is oriented perpendicular to the enclosure support axle 4, such that the float arm 5 is oriented along a longitudinal direction, and wherein the enclosure support axle 4 is oriented along a lateral direction, thus facilitating efficient transferal of force from the float arm 5 to the wave energy converter mechanism 7. Some embodiments may further comprise a counterweight being connected within the enclosure 3 adjacent to the proximal end 51 of the float arm 5, though the location of the counterweight may vary as desired.

In some embodiments, the floatable platform 1 further comprises at least one enclosure mount 2. The enclosure support axle 4, therefore, is mounted to the at least one enclosure mount 2, and the at least one enclosure mount 2 is positioned laterally adjacent to the enclosure 3.

More specifically, in some embodiments, the at least one enclosure mount 2 comprises a first enclosure mount 21 and a second enclosure mount 22, with the enclosure 3 being positioned between the first enclosure mount 21 and the second enclosure mount 22. The enclosure support axle 4 is thus connected between the first enclosure mount 21 and the second enclosure mount 22 while traversing through the enclosure 3, such that the enclosure 3 is supported between the first enclosure mount 21 and the second enclosure mount 22 by the enclosure support axle 4. The enclosure 3 is thus able to rotate about the enclosure support axle 4.

Furthermore, the stationary input pulley 71 of the wave energy converter mechanism 7 is axially fixed to the enclosure support axle 4 within the enclosure 3. Therefore, the stationary input pulley 71 is restrained from rotation relative to the enclosure support axle 4. As the enclosure 3 is allowed to rotate about the enclosure support axle 4, the enclosure 3 thus furthermore rotates relative to the stationary input pulley 71. Each pulley of the at least one pulley system 72, as well as the generator output pulley 73, is fixed by an axle to the interior of the enclosure 3, thus being translationally fixed within the enclosure 3 but allowed to rotate. Hence, as the enclosure 3 rotates about the enclosure support axle 4 anchoring the wave energy converter mechanism 7 to the floatable platform 1, the pulleys of the at least one pulley system 72 and the generator output pulley 73 also rotate in an arc about the enclosure support axle 4 and the stationary input pulley 71, rotating the pulleys of the at least one pulley system 72 and the generator output pulley 73 relative to each other.

Since the stationary input pulley 71 is connected through the at least one pulley system 72 to the generator output pulley 73, the rotation of the least one pulley system and the generator output pulley 73 about the stationary input pulley 71 causes the pulleys of the at least one pulley system 72, and thus the generator output pulley 73, to rotate relative to each other.

In some embodiments, the floatable platform 1 further comprises a deck 11 and an opening 12. The at least one enclosure mount 2 is connected atop the deck 11, and the opening 12 traverses through the deck 11. The float arm 5 and the float 6 are aligned within the opening 12, wherein the float arm 5 and the float 6 are free to traverse into the opening 12. The opening 12 should traverse vertically through the entirety of the floatable platform 1, enabling the float 6 to contact the water upon which the floatable platform 1 is floated. Thus, the float 6 is generally constrained to the surface of the water, while the floatable platform 1 rises and falls according to any wave action.

Figure 7:
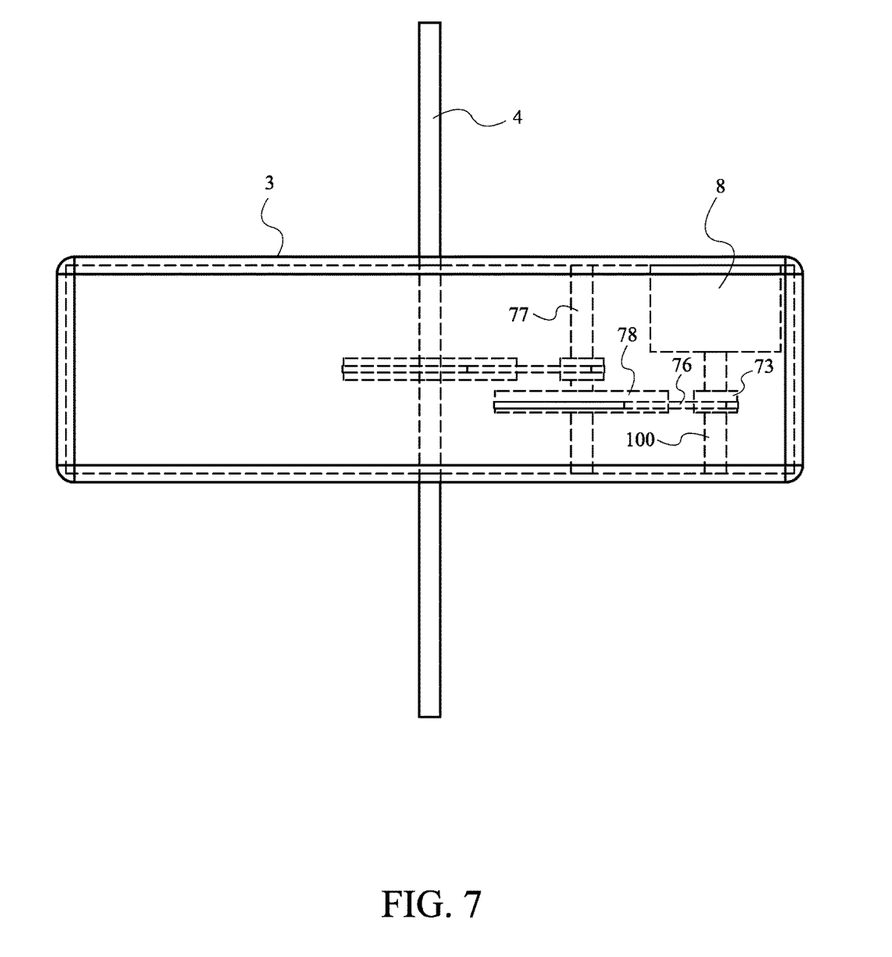
FIG. 7 is an internal top view of the enclosure showing the wave energy converter mechanism according to one embodiment of the present invention.

Referring to FIG. 7, the preferred embodiment of the present invention further comprises a generator axle 100, while the at least one pulley system 72 further comprises an intermediate axle 77 and an intermediate pulley 78. The intermediate pulley 78 is axially fixed to the intermediate axle 77. The generator axle 100 is axially fixed to the electrical generator 8 and the generator output pulley 73, and the intermediate pulley 78 is torsionally coupled to the generator output pulley 73 through a belt 76 or chain.

Figure 8:
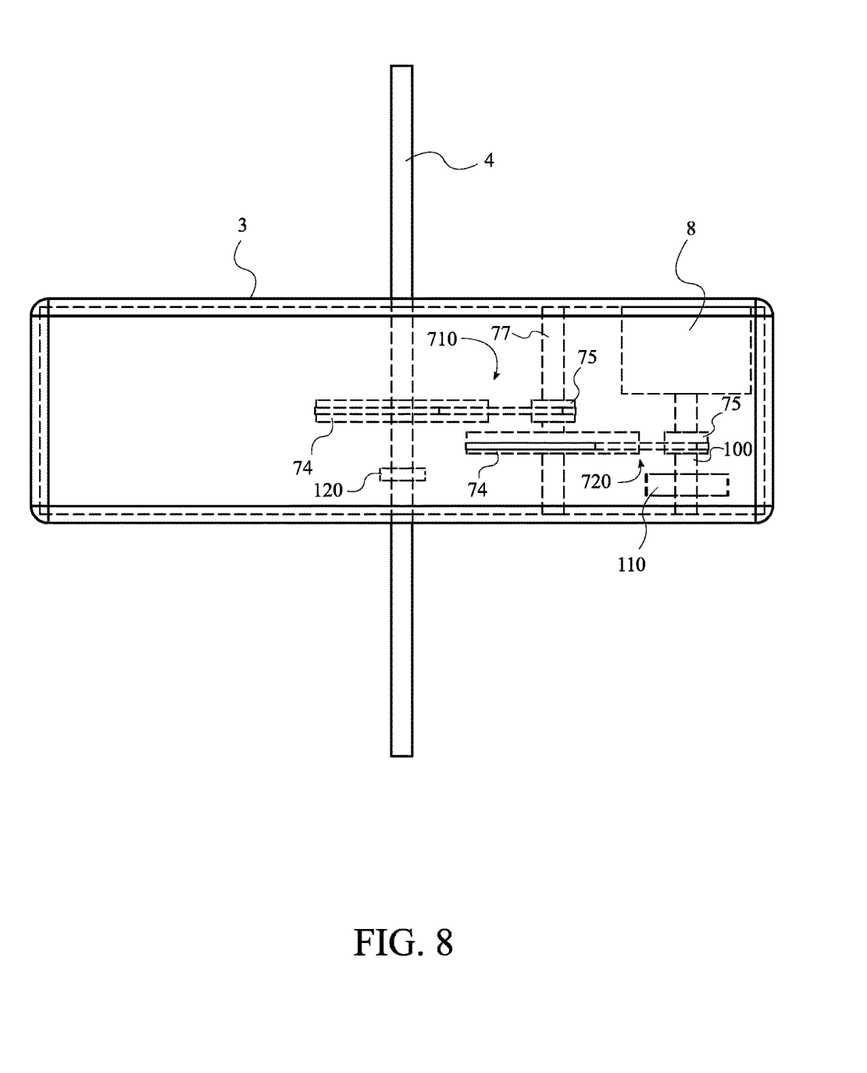
FIG. 8 is an internal top view of the enclosure showing the wave energy converter mechanism according to one embodiment of the present invention.

Referring to FIG. 8, in some embodiments, the at least one pulley system 72 comprises an arbitrary pulley system 710 and an adjacent pulley system 720. The small output pulley 75 of the arbitrary pulley system 710 is axially fixed to the large input pulley 74 of the adjacent pulley system 720. Thus, the rotational speed of the small output pulley 75 of the adjacent pulley system 720 in relation to the small output pulley 75 of the arbitrary pulley system 710 is multiplied by the ratio of the large input pulley 74 of the adjacent pulley system 720 to the small output pulley 75 of the arbitrary pulley system 710.

Figure 9:
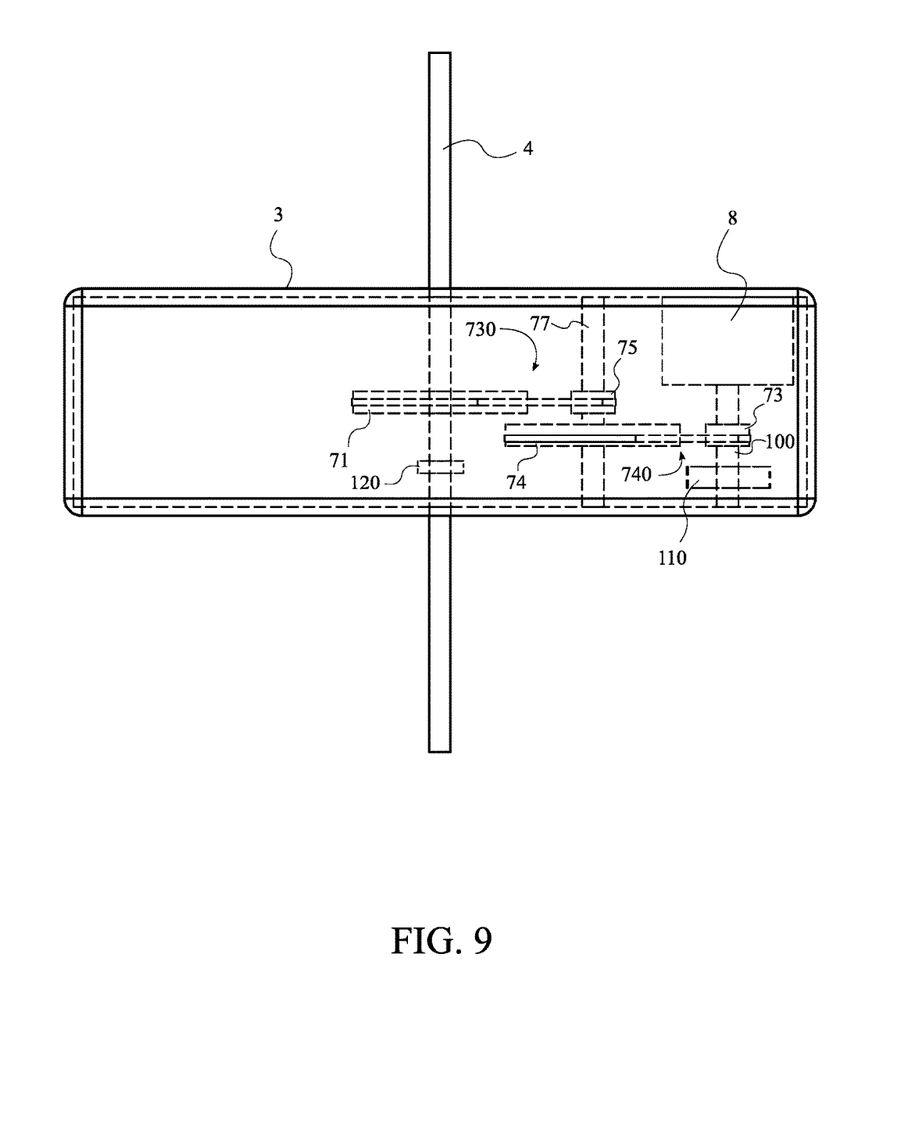
FIG. 9 is an internal top view of the enclosure showing the wave energy converter mechanism according to one embodiment of the present invention.

Referring to FIG. 9, the at least one pulley system 72 may further comprise a first pulley system 730 and a last pulley system 740. In some embodiments, the large input pulley 74 of the first pulley system 730 is the stationary input pulley 71, and the small output pulley 75 of the last pulley system 740 is the generator output pulley 73. Thus, rotational speed is transferred from the stationary input pulley 71, through any intermediary pulley systems of the at least one pulley system 72, and ultimately to the generator output pulley 73, being multiplied through pulley ratios along the way so that, for example, in a single 45-degree rotation of the enclosure 3, the generator output pulley 73, and thus the generator axle 100 connected to the electrical generator 8, is rotated 25 times, generating 25 rotations worth of electricity through the electrical generator 8.

In some embodiments, the small output pulley 75 of the first pulley system 730 is axially fixed to the large input pulley 74 of the last pulley system 740. In some embodiments, the small output pulley 75 of the first pulley system 730 and the large input pulley 74 of the last pulley system 740 are axially fixed to an intermediate axle 77, wherein the intermediate axle 77 is rotationally connected to the housing. Thus, the small output pulley 75 of the first pulley system 730 and the large input pulley 74 of the last pulley system 740 are translationally fixed in place relative to the enclosure 3, but are free to rotate on the intermediate axle 77.

Thus, in one preferred embodiment, presented herein as a non-limiting example, the stationary input pulley 71 is the large input pulley 74 of the first pulley system 730. The stationary input pulley 71 is torsionally connected to the small output pulley 75 of the first pulley system 730 by a chain or belt 76. The ratio of the diameters of the stationary input pulley 71 to the small output pulley 75 may be, but is not limited to, ten to one. The small output pulley 75 of the first pulley system 730 transfers its angular velocity to the intermediate axle 77, and thus the large input pulley 74 of the last pulley system 740. The large input pulley 74 of the last pulley system 740 then transfers its tangential velocity to the small output pulley 75 of the last pulley system 740, which is the generator output pulley 73. Again, the ratio of the diameters of the large input pulley 74 of the last pulley system 740 to the generator output pulley 73 may be, but is not limited to, ten to one. Thus, with two pulley systems with a 10:1 ratio connecting the stationary input pulley 71 to the generator output pulley 73, the input rotation is multiplied by 100.

Furthermore, as the floatable platform 1 rises and sinks relative to the float 6 due to wave action, the float arm 5 causes the enclosure 3 to rotate about the enclosure support axle 4. The small output pulley 75 of the first pulley system 730 rotates in an arc about the stationary input pulley 71, wherein the stationary input pulley 71 in the current example is the large input pulley 74 of the first pulley system 730. Since the small output pulley 75 of the first pulley system 730 is torsionally connected to the stationary input pulley 71 by a fixed belt 76 or chain, the arced rotation of the small output pulley 75 of the first pulley about the stationary input pulley 71 causes the small output pulley 75 of the first pulley system 730 to rotate. This rotation is thus transferred to the large input pulley 74 of the second pulley system, being axially fixed to the small output pulley 75 of the first pulley system 730, and further multiplied from the large input pulley 74 of the second pulley system to the small output pulley 75 of the second pulley system, which is also the generator output pulley 73, thus generating electricity.

Some embodiments of the present invention may further comprise a flywheel 110, as can be seen in FIG. 8. The flywheel 110 serves to maintain a consistent rotational speed delivery of the wave energy converter mechanism 7 to the electrical generator 8 through potentially inconsistent wave action. The flywheel 110 may be rotationally connected to one of the at least one pulley system 72, or the flywheel 110 may be rotationally connected to the generator axle 100, or anywhere else in the system the flywheel 110 may function optimally.

Furthermore, as illustrated in FIG. 8, the present invention may comprise a reversible ratchet gear 120 operatively engaged with one of the at least one pulley system 72. The reversible ratchet gear 120 may be connected with the wave energy converter mechanism 7 in any applicable configuration to enable adequate rotational force applied to the system to maintain the generator axle 100 spinning in the proper direction. In some embodiments, the reversible ratchet gear 120 is connected to the large input pulley 74 of the last pulley system 740 or second pulley system, or to the intermediate pulley 78, or to the intermediate axle 77, as appropriate.

Preferably, the floatable platform 1 further comprises a keel 130, and/or rudder connected to the deck 11 opposite the enclosure 3 mount, and the keel 130 should be laterally aligned with the float arm 5. The purpose of the keel 130 is to maintain a proper orientation of the floatable platform 1 in relation to the wave action and/or wind forces to ensure optimal orientation of the float arm 5. Furthermore, the keel 130 may act as a brace or a stop which may prevent the float arm 5 from rotating downwards more than a certain amount, such as, but not limited to, 90 degrees downward from horizontal, as can be seen in FIG. 4.

Figure 10:
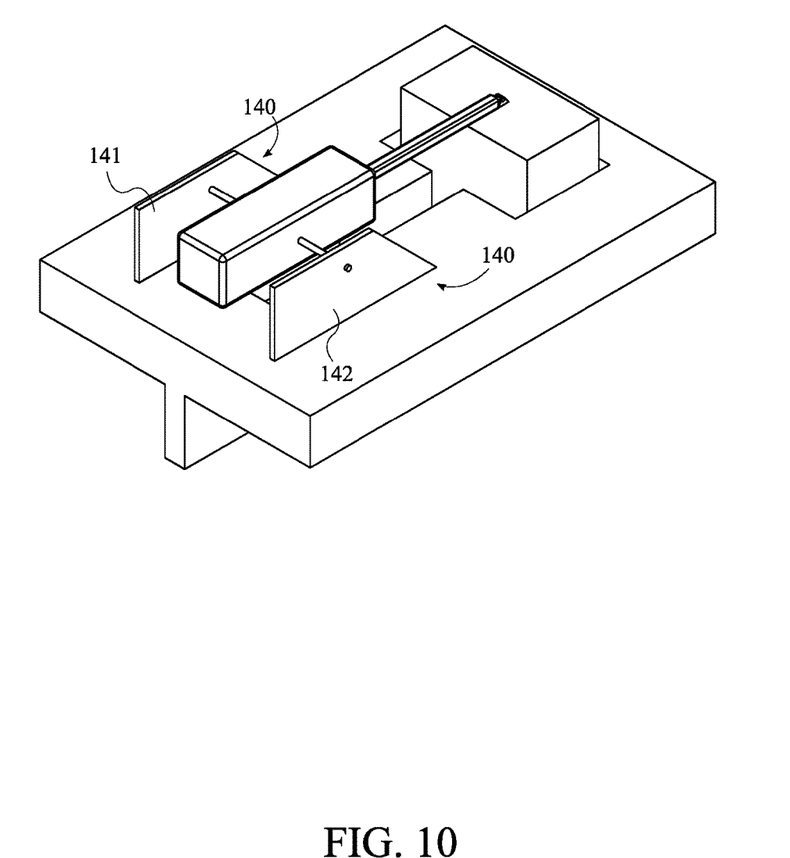
FIG. 10 is a perspective view of the present invention illustrating weathervane fins according to one embodiment of the present invention.

Moreover, referring to FIG. 10, some embodiments of the present invention may further comprise at least one weathervane fin 140 connected to the deck 11 of the floatable platform 1, being oriented along the longitudinal direction, and distributed symmetrically about a longitudinal centerline of the deck 11. The at least one weathervane fin 140 acts to keep the floatable platform 1 oriented into any wind forces to which the floatable platform 1 may be subjected. In some embodiments, the at least one enclosure mount 2 may double as the at least one weathervane fin 140. In some embodiments, the at least one weathervane fin 140 comprises a first weathervane fin 142 and a second weathervane fin 144, corresponding to the first enclosure mount 22 and the second enclosure 3 mount. In some embodiments, the at least one weathervane fin 140 may be a separate component or a plurality of separate components from the at least one enclosure mount 2.

Although the invention has been explained in relation to its preferred embodiment, it is to be understood that many other possible modifications and variations can be made without departing from the spirit and scope of the invention as hereinafter claimed.

What is claimed is:

1. A wave energy converter deep sea mounting system comprises:
    a floatable platform;
    an enclosure support axle;
    a float arm;
    a float;
    a wave energy converter mechanism;
    an electrical generator;
    an enclosure;
    the float arm comprises a proximal end and a distal end;
    the enclosure support axle being mounted to the floatable platform, wherein the enclosure support axle is affixed in place relative to the floatable platform and does not rotate relative to the floatable platform;
    the enclosure support axle traversing through the enclosure;
    the enclosure being rotatably engaged with the enclosure support axle, wherein the enclosure is free to rotate about the enclosure support axle;
    the wave energy converter mechanism and the electrical generator being positioned within the enclosure;
    the wave energy converter mechanism comprises a stationary input pulley, at least one pulley system, and a generator output pulley, wherein each of the at least one pulley system comprises a large input pulley and a small output pulley;
    the large input pulley being torsionally coupled to the small output pulley by a belt for each of the at least one pulley system;
    the stationary input pulley being mounted within the enclosure, wherein the stationary input pulley is restrained from rotation relative to the enclosure;
    the float being connected to the distal end of the float arm;
    the proximal end of the float arm being connected to the enclosure;
    the stationary input pulley being torsionally and mechanically coupled to the generator output pulley through the at least one pulley system; and
    the generator output pulley being rotatably coupled to the electrical generator.

2. The wave energy converter deep sea mounting system as claimed in claim 1, wherein the wave energy converter mechanism and the generator are hermetically sealed within the enclosure.

3. The wave energy converter deep sea mounting system as claimed in claim 1 comprises:
    the float arm being oriented perpendicular to the enclosure support axle, wherein the float arm is oriented along a longitudinal direction, and wherein the enclosure support axle is oriented along a lateral direction.

4. The wave energy converter deep sea mounting system as claimed in claim 1 comprises:
    the floatable platform further comprises at least one enclosure mount;
    the enclosure support axle being mounted to the at least one enclosure mount; and
    the at least one enclosure mount being positioned laterally adjacent to the enclosure.

5. The wave energy converter deep sea mounting system as claimed in claim 4 comprises:
    the at least one enclosure mount comprises a first enclosure mount and a second enclosure mount;
    the enclosure being positioned between the first enclosure mount and the second enclosure mount; and
    the enclosure support axle being connected between the first enclosure mount and the second enclosure mount, wherein the enclosure is supported between the first enclosure mount and the second enclosure mount by the enclosure support axle.

6. The wave energy converter deep sea mounting system as claimed in claim 1 comprises:
    the floatable platform further comprises a deck and an opening;
    at least one enclosure mount being connected atop the deck;
    the opening traversing through the deck; and
    the float arm and the float being aligned with the opening, wherein the float arm and the float are free to traverse into the opening.

7. The wave energy converter deep sea mounting system as claimed in claim 1 comprises:
    a generator axle;
    the at least one pulley system comprises an intermediate axle and an intermediate pulley;
    the intermediate pulley being axially fixed to the intermediate axle;
    the generator axle being axially fixed to the electrical generator and the generator output pulley; and
    the intermediate pulley being torsionally coupled to the generator output pulley.

8. The wave energy converter deep sea mounting system as claimed in claim 1 comprises:
    an arbitrary pulley system and an adjacent pulley system from the at least one pulley system; and
    the small output pulley of the arbitrary pulley system being axially fixed to the large input pulley of the adjacent pulley system.

9. The wave energy converter deep sea mounting system as claimed in claim 1 comprises:

a first pulley system and a last pulley system from the at least one pulley system;
the large input pulley of the first pulley system being the fixed stationary pulley; and
the small output pulley of the last pulley system being the generator output pulley.

10. The wave energy converter deep sea mounting system as claimed in claim 9 comprises:
the small output pulley of the first pulley system being axially fixed to the large input pulley of the last pulley system.

11. The wave energy converter deep sea mounting system as claimed in claim 9 comprises:
the small output pulley of the first pulley system and the large input pulley of the last pulley system being axially fixed to an intermediate axle; and
the intermediate axle being rotationally connected to the housing.

12. The wave energy converter deep sea mounting system as claimed in claim 1 comprises:
a flywheel; and
the flywheel being rotationally connected to one of the at least one pulley system.

13. The wave energy converter deep sea mounting system as claimed in claim 1 comprises:
a reversible ratchet gear; and
the reversible ratchet gear being operatively engaged with one of the at least one pulley system.

14. The wave energy converter deep sea mounting system as claimed in claim 1 comprises:
a reversible ratchet gear; and
the reversible ratchet gear being operatively engaged with an intermediate pulley of the at least one pulley system.

15. The wave energy converter deep sea mounting system as claimed in claim 1 comprises:
the floatable platform further comprises a keel;
the keel being connected to the deck opposite an enclosure mount of the floatable platform; and
the keel being laterally aligned with the float arm.

16. The wave energy converter deep sea mounting system as claimed in claim 1 comprises:
an anchor line; and
the float being connected to the anchor line.

17. The wave energy converter deep sea mounting system as claimed in claim 1 comprises:
at least one weathervane fin;
the at least one weathervane fin being connected to a deck of the floatable platform;
the at least one weathervane fin being oriented along a longitudinal direction; and
the at least one weathervane fin being distributed symmetrically about a longitudinal centerline on the deck.

18. The wave energy converter deep sea mounting system as claimed in claim 1 comprises:
a counterweight; and
the counterweight being connected within the enclosure adjacent to the proximal end of the float arm.

* * * * *